Sept. 28, 1965   H. W. DIETERT   3,208,593
CYLINDRICAL SCREENING APPARATUS
Filed April 27, 1964
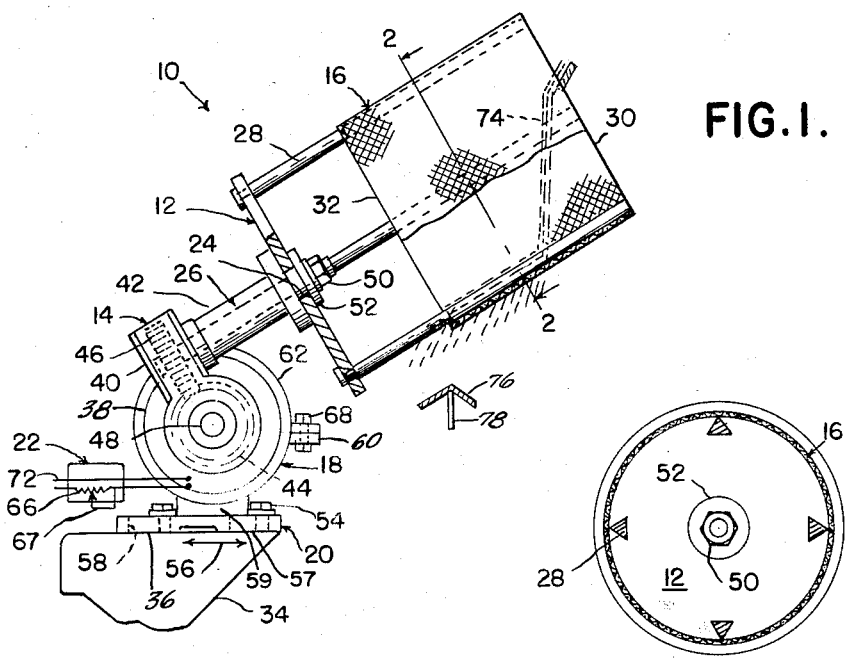
FIG. 1.
FIG. 2.
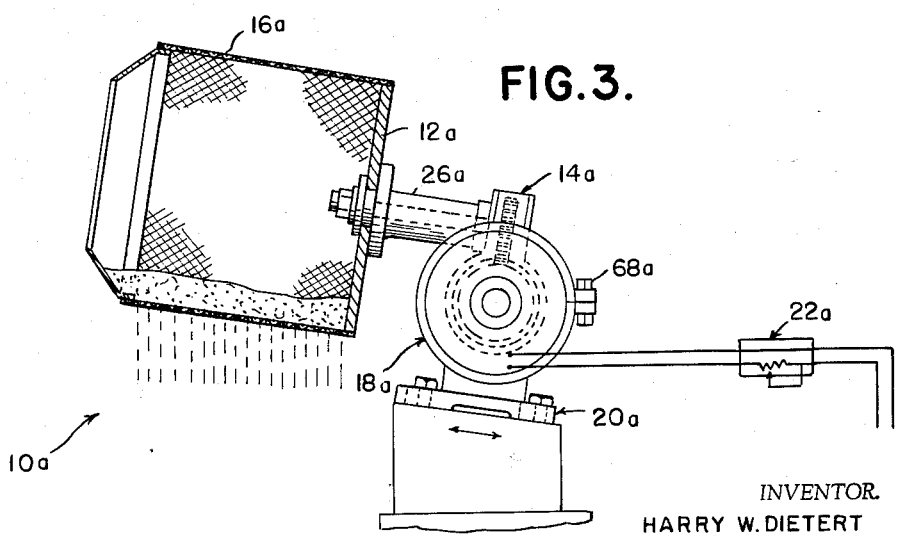
FIG. 3.
INVENTOR.
HARRY W. DIETERT
BY
ATTORNEYS United States Patent Office 3,208,593
Patented Sept. 28, 1965

3,208,593
CYLINDRICAL SCREENING APPARATUS
Harry W. Dietert, Kerrville, Tex., assignor to Harry W.
Dietert Co., Detroit, Mich., a corporation of Michigan
Filed Apr. 27, 1964, Ser. No. 362,837
4 Claims. (Cl. 209—288)

This application is a continuation-in-part of application, Serial No. 132,902, now Patent No. 3,151,368, filed August 21, 1961, for an invention in Rotary Screen Moldability Controllers.

The invention relates to separating apparatus and refers more specifically to rotatable screen structure for separating granular material in accordance with the moldability of the granular material.

In the past apparatus for separating granular material in accordance with the moldability thereof have not had required flexibility. They have not generally been adjustable with respect to speed of operation position or position with respect to adjacent system apparatus.

Further many of the prior apparatus for separating granular material according to the moldability thereof have required the use of expensive vibrators and/or other relatively complicated apparatus.

It is therefore one of the objects of the present invention to provide improved separating apparatus.

Another object of the present invention is to provide improved apparatus for separating granular material in accordance with the moldability thereof.

Another object is to provide apparatus for separating grandular material including an inclined rotatably mounted base, a cylindrical screen open at one end and secured at the other end to and extending from one side of the base and means for rotating the base.

Another object is to provide structure as set forth above wherein the screen is supported a predetermined distance from the base to permit the granular material passing through the screen to be discharged from the lower end thereof.

Another object is to provide structure as set forth above wherein the base is mounted for angular movement to vary the angle of inclination of the rotatable cylindrical screen.

Another object is to provide structure as set forth above wherein the means for rotating the base is mounted for linear movement having a component in the direction of the axis of the screen.

Another object is to provide structure as set forth above wherein the means for rotating the cylindrical screen is variable in speed.

Another object is to provide apparatus for separating granular material in accordance with the moldability thereof which is simple in structure, economical to produce and efficient in use.

Other objects and features of the invention will become apparent as the description proceeds, especially when taken in conjunction with the accompanying drawings illustrating a preferred embodiment of the invention, wherein:

FIGURE 1 is an elevation view partly broken away of apparatus for separating granular material in accordance with the moldability thereof constructed in accordance with the invention.

FIGURE 2 is a transverse cross section of the rotatable cylindrical screen of the apparatus for separating granular material in accordance with the moldability thereof illustrated in FIGURE 1 taken substantially on the line 2—2 in FIGURE 1.

FIGURE 3 is a partly broken away elevation view of a modification of the structure for separating granular material in accordance with the moldability thereof illustrated in FIGURES 1 and 2.

With particular reference to the figures of the drawings one embodiment of the invention will now be considered in detail.

In general the apparatus 10 for separating granular material in accordance with the moldability thereof comprises a base 12, means 14 mounting the base 12 for rotation and cylindrical screen 16 into which granular material 74 is fed for separation in accordance with the moldability thereof. Apparatus 10 also includes the structure 18 for adjusting the angle of inclination of screen 16, the structure 20 for adjusting the position of the screen 16 in the directions of arrows 56 and the apparatus 22 for controlling the speed of rotation of the screen 16.

More specifically the base 12 is a circular disc including an opening 24 therein through which shaft 26 extends. Triangular rods 28 are spaced angularly about the outer periphery of the disc 12 as shown best in FIGURE 2. The rods 28 are secured to the base 12 by convenient means such as bolting or welding the extend rigidly from the upper side of the disc 12 and perpendicularly thereto.

Screen 16 as shown in FIGURES 1 and 2 is cylindrical and is open at both the upper end 30 and the lower end 32. The screen is rigid and is of a mesh to pass the granules of material passed thereinto unless the granules of material are adhered together in cohesive masses.

The means 14 for rotatably mounting the base 12 includes a support 34, a bracket 36 mounted on the support, an electric motor 38 carried by the bracket 36 and housing members 40 and 42 for mounting the worm 44 and worm gear 46 in mesh. Worm 44 is turned by motor 38 through shaft 48. Worm gear 46 is secured to shaft 26 for rotation therewith while shaft 26 is mounted for rotation in the housing 42. Base 12 is secured to shaft 26 for rotation therewith by means of the nut 50 and washer 52.

The structure 20 for adjustably supporting the bracket 36 on support 34 includes a pair of bolts 54 movable in slots, elongated in the direction of arrows 56, provided in supporting plate 57 of bracket 36.

Besides the supporting plate 57, the bracket 36 includes the cylindrical sleeve 62 supported on supporting plate 57 by the bracket member 59. The sleeve 62 is split transversely with a longitudinally extending split at 60. The motor 38 may thus be moved angularly within the sleeve 62 provided by bracket 36 to adjust the angular position of the screen 16. Bolts 68 serve to lock the screen in an adjusted angular position and must be loosened before adjustment of the screen.

The motor 38 is electrical as previously indicated. The speed of rotation thereof and thus the speed of rotation of the screen 16 is therefore varied by means of a variable resistor 66 and external control therefor 67 provided in the apparatus 22 for controlling the speed of rotation of the screen 16.

In operation, to separate granular material in accordance with the moldability thereof, as more specifically defined in the copending parent application, the screen is adjusted in the direction of arrows 56 by loosening the bolts 54, sliding the bracket 36 in the desired direction to position the low point of the lower end of the screen over the apex of the balance 76 supported on torsion band 78, and resecuring the bolts 54. The angle of inclination of the screen 16 is also adjusted by loosening bolt 68 and angularly rotating the motor 38 in the sleeve 62.

The motor 38 is then energized over conductors 72 connected to a source of electrical energy (not shown) whereby the screen 16 is rotated through the shaft 48, worm 44, worm gear 46, shaft 26, base 12 and rods 28. The speed of rotation of the screen 16 may be varied by adjusting the resistor 66.

With the screen 16 in a desired position and at the desired angle and rotating at a selected speed, the granular material to be separated in accordance with the moldability thereof 74 is fed into the upper end 30 of the screen 16 and traverses downwardly through the rotating screen toward the lower end 32 thereof. Part of the granular material falls through the screen 16 while another part thereof completely traverses the screen and passes out the open bottom 32 of the screen 16. In accordance with the definition of "moldability" set up in the parent application, the parts of the granular material passing transversely through the screen and passing through the end of the screen may be used to determine moldability in accordance with the following formula wherein A is the weight of granular material passing longitudinally of the screen through the lower end of the screen and B is the weight of granular material passing transversely through the screen:

$$\text{Moldability} = \frac{B}{A+B} \cdot 100$$

The modified apparatus 10a for separating granular material in accordance with the moldability thereof illustrated in FIGURE 3 is similar to the separating apparatus 10. The same reference characters have therefore been used to define the same elements in sorting apparatus 10a as have been used in designating elements in apparatus 10 with the suffix a added thereto.

The only differences between the apparatus 10 and 10a is that the rods 28 are not provided in conjunction with the sorting apparatus 10a. Thus the screen 16a is secured directly to the base 12a in the sorting apparatus 10a, whereby the granular material 74a deposited in the screen 16a is separated into two parts one of which remains in the screen 16a and the other of which passes transversely through the screen to form the relative weight of granular materials A and B for use in the above moldability formula.

The sorting apparatus 10 is more suited for use in automatic control mechanisms. The sorting apparatus 10a is more likely to be used for individual measurements of moldability of granular material after it has been mixed.

While one embodiment of the present invention and a modification have been disclosed in detail, it will be understood that a plurality of other embodiments and modifications are contemplated. It is the intention to include all modifications and embodiments as are defined by the appended claims within the scope of the invention.

What I claim as my invention is:

1. Apparatus for separating granular material placed therein into portions in accordance with the moldability thereof as defined by the formula $$\text{Moldability} = \frac{B}{A+B} \cdot 100$$

wherein A is the weight of granular material passing longitudinally through the lower end of a rotated inclined cylindrical screen and B is the weight of granular material passing transversely through the cylindrical screen, said apparatus comprising a circular base plate having an upper and lower side inclined to the horizontal and perpendicular to the longitudinal axis of the screen, motor means, means connected between the base plate and motor means for rotating the base plate in response to operation of the motor means, a cylindrical screen having upper and lower ends open at both ends extending substantially perpendicular to and with the lower end thereof in spaced apart relation to the upper side of the base plate, rod means securing the screen to the base plate maintaining the spaced apart relation therebetween whereby the screen is maintained open around substantially the entire periphery thereof at the lower end of the screen, means for varying the speed of operation of the motor means, means for adjusting the motor means, base plate and screen in a direction extending longitudinally of the screen and means for varying the angle of inclination of the base plate and the screen secured thereto.

2. Structure as set forth in claim 1 wherein the motor means is an electric motor and an input power circuit thereto and the means for varying the speed of operation thereof comprises a potentiometer in the input power circuit thereto.

3. Structure as set forth in claim 1 wherein the means for adjusting the motor means, base plate and screen in a direction extending longitudinally of the screen comprises a mounting bracket for the motor including a sleeve in which the motor is variably positioned, a supporting plate and a bracket member connecting the sleeve and supporting plate and a bracket member connecting the sleeve and supporting plate and an elongated slot in the supporting plate and nut mounting means for said supporting plate extending through the slot therein.

4. Structure as set forth in claim 1 and further including a mounting bracket for said motor means including a sleeve in which the motor is variably positioned, a supporting plate and a bracket member connecting the sleeve and supporting plate and the means for varying the angular position of the screen comprises a transverse, longitudinally extending split in the mounting bracket sleeve and nut means secured to the sleeve and extending across the split therein for loosening and tightening the sleeve on said motor means.

References Cited by the Examiner

UNITED STATES PATENTS

| | | | |
|---|---|---|---|
| 85,992 | 1/69 | Bringmann | 209—369 XR |
| 478,159 | 7/92 | Howe | 259—81 |
| 615,325 | 12/98 | Updegraff | 209—284 |
| 928,065 | 7/09 | Hanna | 209—369 XR |
| 1,198,395 | 9/16 | Marshall | 209—284 |
| 1,659,557 | 2/28 | Adelmann | 209—369 XR |
| 2,147,302 | 2/39 | Long | 68—23 XR |
| 2,155,587 | 4/39 | Fairbank | 209—451 XR |
| 2,203,430 | 6/40 | Goldberg | 251—81 |
| 3,002,623 | 10/61 | Fontaine | 209—288 |

FOREIGN PATENTS 507,117  6/20  France.

HARRY B. THORNTON, *Primary Examnier.*